United States Patent [19]
Cunningham

[11] 3,933,200
[45] Jan. 20, 1976

[54] TEMPERATURE CONDITIONING MEANS

[75] Inventor: Donald M. Cunningham, Pittsburgh, Pa.

[73] Assignee: Emerson Electric Co., St. Louis, Mo.

[22] Filed: June 21, 1974

[21] Appl. No.: 481,895

[52] U.S. Cl. .................. 165/64; 165/171; 219/535; 219/537; 219/549; 338/213

[51] Int. Cl.² ..... F28F 1/16; F28F 1/22; F28F 1/26; F28F 1/32

[58] Field of Search ........... 219/535, 539, 549, 537, 219/550; 338/213; 165/64, 171, 61

[56] References Cited

UNITED STATES PATENTS

| | | | |
|---|---|---|---|
| 2,549,569 | 4/1951 | Bradley | 165/30 X |
| 2,722,597 | 11/1955 | Steiner | 219/549 |
| 2,786,125 | 3/1957 | Drugmand et al. | 219/535 X |
| 3,240,915 | 3/1966 | Carter et al. | 219/343 |
| 3,317,958 | 5/1967 | Stroup et al. | 165/64 |
| 3,384,167 | 5/1968 | Javkin | 165/171 |
| 3,749,881 | 7/1973 | Tanaka | 219/549 X |

FOREIGN PATENTS OR APPLICATIONS

| | | | |
|---|---|---|---|
| 1,099,145 | 2/1961 | Germany | 219/550 |
| 71,437 | 1/1916 | Switzerland | 219/535 |

Primary Examiner—Albert W. Davis, Jr.
Assistant Examiner—Sheldon Richter
Attorney, Agent, or Firm—Michael Williams

[57] ABSTRACT

The invention relates to apparatus for conditioning the temperature of an elongated tubular member, and the contents therein, and comprises a plurality of cast metal shoes adapted to be connected in side-by-side relation about the periphery of the member. Certain of the shoes contain cooling means and certain other of the shoes contain electric heating means. The invention provides for identical construction of all of the shoes, apart from the contained cooling and heating means, and includes means for connecting the shoes in side-by-side relation without the need of special tools.

7 Claims, 6 Drawing Figures

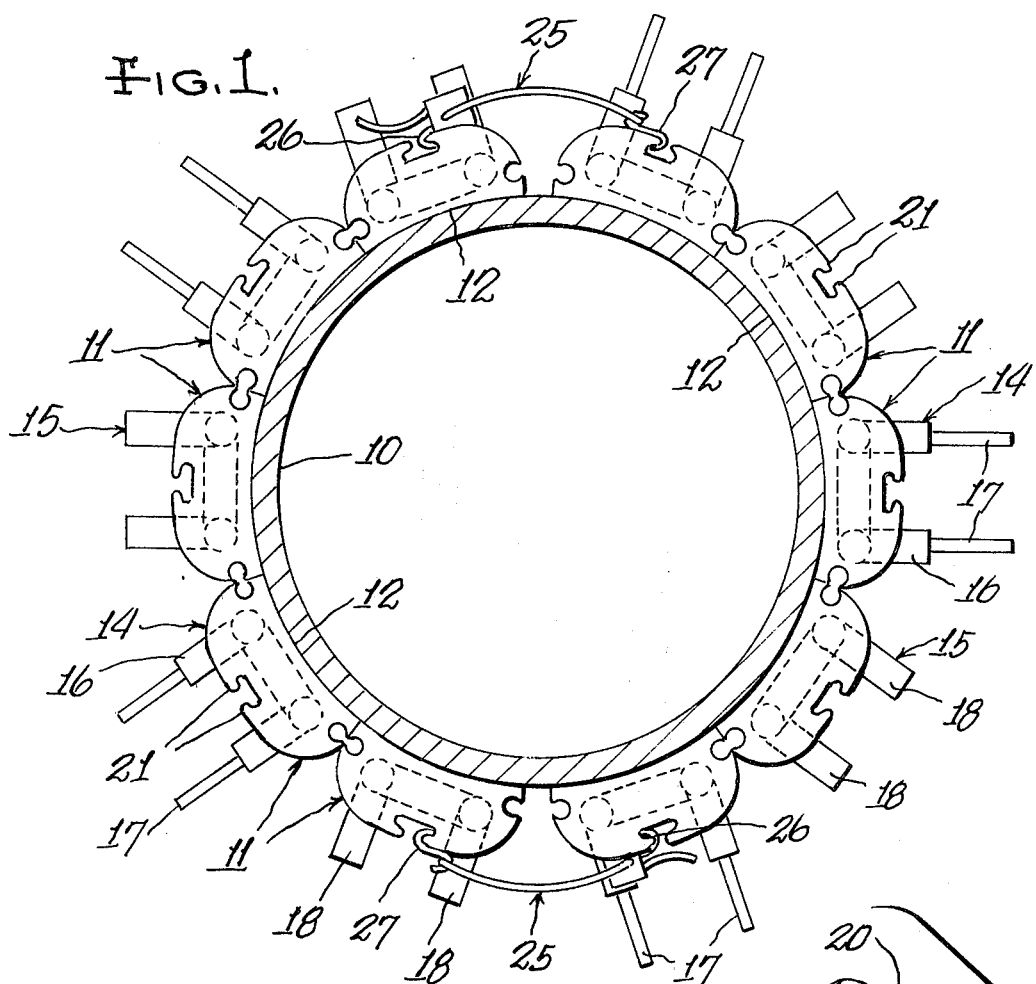
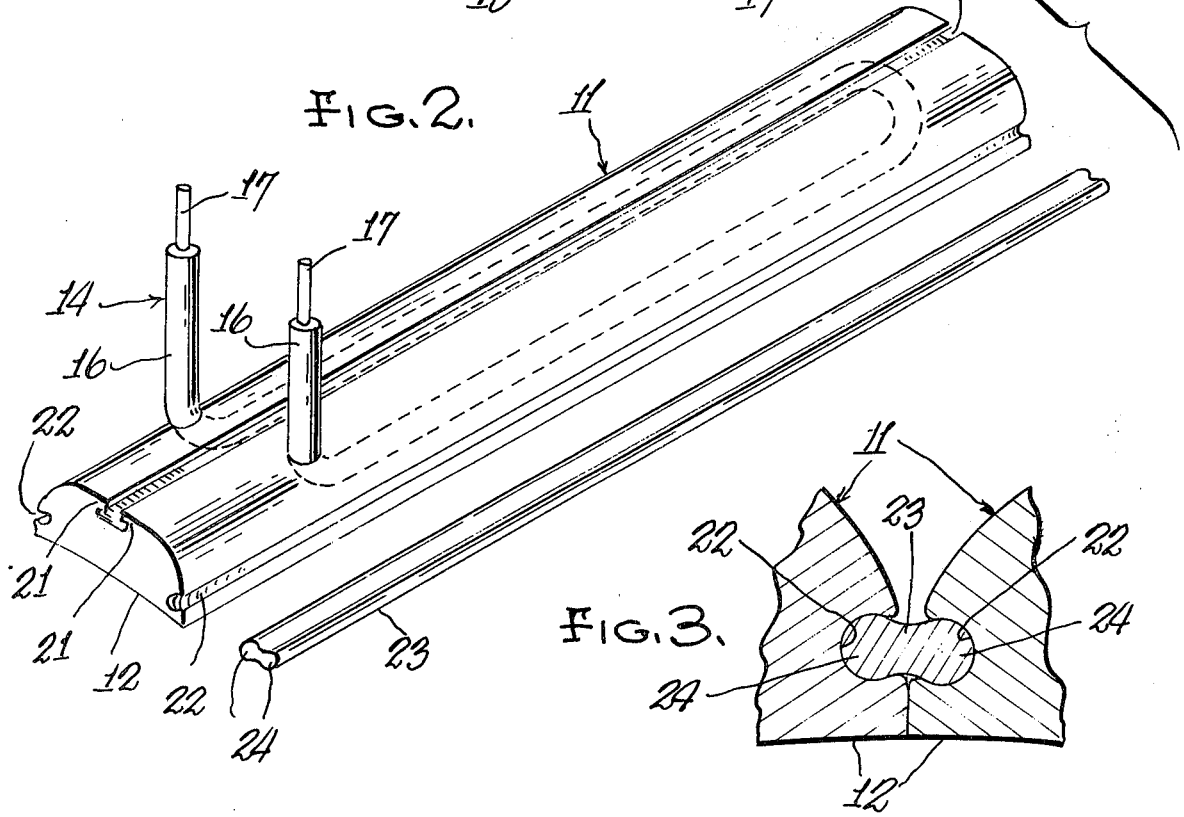

TEMPERATURE CONDITIONING MEANS

BACKGROUND AND SUMMARY

The improved apparatus is particularly suited for heating and cooling of the plasticizer tube of an extruder for thermoplastics, although it will be appreciated that it may have other applications. In extruders of the type mentioned, control of the temperature of the plastic is important since although initially the extruding chamber may require heat to soften the plastic to extrudable condition, consideration must be given to the heat energy developed as a result of the friction of the plastic particles driven fowardly by the extruding screw. Thus, unless the temperature of the plasticizing tube is not carefully controlled, an excess amount of heat may have an adverse effect on the plastic being extruded.

Heating and cooling arrangements for extruding apparatus are within the prior art but in some cases require adaptation of the extruding tube to accomodate the same. Band type arrangements have also been proposed but these, insofar as I am aware, utilized heat sink structures, like metallic shoes, between the heating and cooling means and the extruder tube, and therefore required a number of parts which were expensive to produce and difficult to assemble.

My invention utilizes a plurality of identical cast metal shoes, and thus eliminates need for a plurality of different molds, as well as storage of multiple parts. The heating or cooling means are embedded in the casting to provide the ultimate in thermal transfer. Each of the shoes has means at its opposite sides to provide for quick and easy connection of the shoes in side-by-side relation to form a band about the plasticizer tube.

DESCRIPTION OF THE DRAWINGS

In the drawings accompanying this specification and forming part of this application, these are shown, for purpose of illusration, several embodiments which my invention may assume, and in these drawings:

FIG. 1 is a transverse sectional view through an elongated tubular member (such as the plasticizer tube of an extruder for thermoplastics), showing one embodiment of my invention, FIG. 2 is a perspective view of one of the shoes and splines shown in FIG. 1, FIG. 3 is an enlarged fragmentary sectional view showing the spline connection.

DESCRIPTION OF PREFERRED EMBODIMENT

Figure 4:
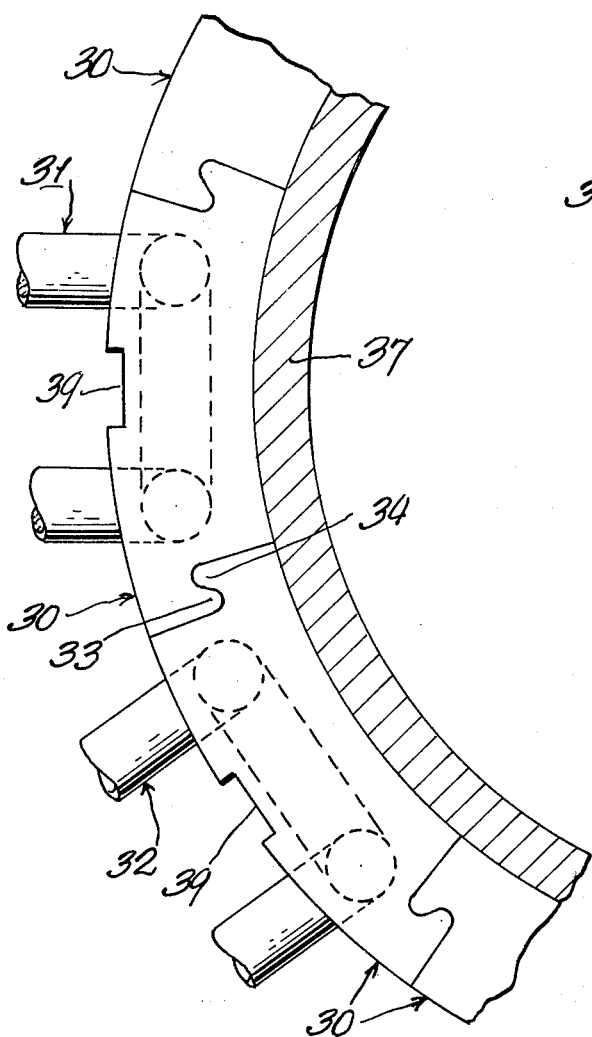
FIG. 4 is a fragmentary transverse view through an elongated tubular member, showing another embodiment of my invention.

The cylindrical member 10 shown in transverse section in FIG. 1 may represent any type of container, the contents of which are to be selectively heated or cooled. As before pointed out, my invention is particlarly suited to heat and cool the plasticizer tube of an extruder for thermoplastics, and such tubes may be in the order of 12 to 20 feet long, and of stepped diameters.

The shoes 11 forming a part of my invention may be in the order of ten to twenty inches long and therefore a plurality of shoe assemblies may be disposed in spaced relation longitudinally of the plasticizer tube. At the present time the shoes 11 are cast of a suitable aluminum alloy, although other alloys, such as bronze alloy, may be used.

As seen in FIGS. 1 and 2, each shoe has an unbroken inner surface 12 which has a slight transverse curvature so as to be complementary to the outer transverse surface of the tube 10 and therefore closely fit thereagainst for the entire length of the shoe. An electric heating element 14, or a cooling tube 15, are embedded within the shoes by casting the latter thereabout.

An electric heating element 14 is shown embedded in the shoe illustrated in FIG. 2 and may be of any commercially available kind, such as type TRI sold under the trademark Chromalox by the Edwin L. Wiegand Division of Emerson Electric Co. The heating element has a incoloy tubular sheath and is bend to hair-pin formation, as shown, with terminal portions 16—16 extending outwardly of the shoe and having terminal pins 17—17 for connection to a supply of electrical energy. Instead of a heating element, a steel tube may be embedded within a shoe to constitute the cooling means 15, the tube having terminal portions 18 extending from the shoe in the same manner as the terminal portions 16 of the heating element, and such terminal portions 18 may be connected to a source of cooling fluid.

As seen in FIG. 1, the shoes are connected in side-to-side relation, with the shoes carrying the heating and cooling means preferably alternately arranged. Apart from the fact that the shoes carry heating or cooling means, they may otherwise be of identical construction. Referring particularly to FIG. 2, each shoe has a longitudinal recess 20 entering from its outer transverse surface, and each recess 20 is preferably T-shaped to provide hook-like fingers 21.

At each side, the shoe is formed with a longitudinal groove 22 which, as best seen in FIG. 3, is slightly greater than half a circle in cross-section. A metal spline 23 is provided to connect adjoining sides of adjacent shoes and the spline has a figure eight transverse outline to provide circular side enlargements 24—24 which closely fit within respective grooves 22. This construction provides a slight amount of swinging adjustment of the adjacent shoes relative to the spline.

As seen in FIG. 1, the shoes are disposed in band fashion about the tube 10. Since it is preferable to tension the shoes about the tube, certain adjacent shoes, like the ones at the top and bottom in FIG. 1, are connected by a suitable tensioning means, although such connection may be made only at one place, with the other shoes connected by the splines. The tensioning means may be of any suitable commercially available type, such as the drawhook type shown at 25, manufactured and sold by Rexnord, Inc. The fastener 25 is slightly modified so that its base is formed with a hook 26 which fits around the finger 21 of a shoe. The catch of the drawhook is also modified to provide a hook 27 which fits around the finger of the adjacent shoe. Preferably, the tensioning means are disposed at longitudinally opposite ends of the shoes. The longitudinal recess 20 on the back side of each shoe will provide a certain degree of transverse flexibility of the shoe, especially since the cast alloy has relatively low strength at elevated temperatures of 500° Fahrenheit or higher. Thus the tensioning means will have a tendency to closely conform the shoe inner surface to the periphery of the tubular member 10.

DESCRIPTION OF OTHER EMBODIMENT

Figure 6:
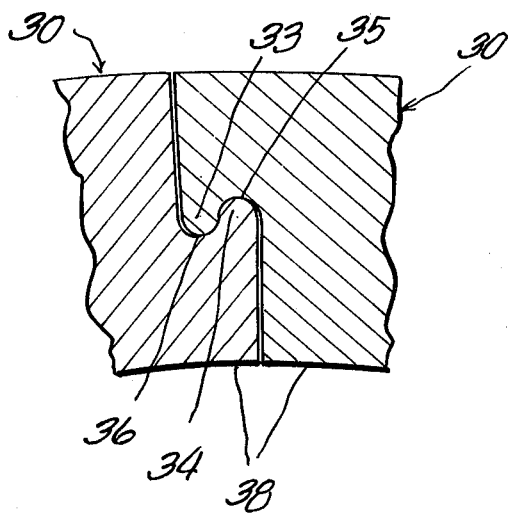
FIG. 6 is a fragmentary transverse sectonal view through the connection of adjoining shoes.
Figure 5:
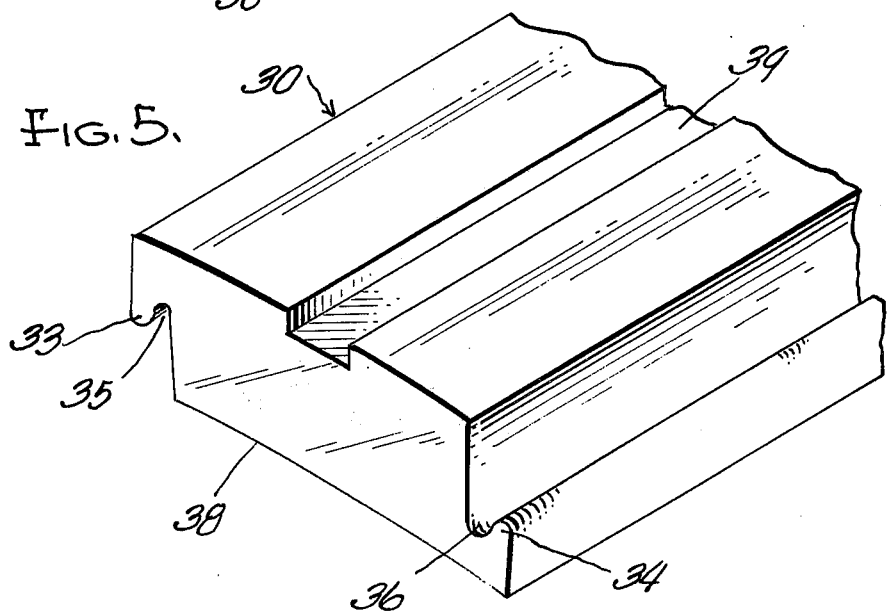
FIG. 5 is a fragmentary perspective view of one of the shoes in FIG. 4.

The shoes 30 shown in FIGS. 4 through 6 eliminate the need of a separate spline for connecting purposes, but in other respects are similar to the shoes heretofore described. Thus, each shoe is an alloy casting, certain having a tubular electric heating element 31 embedded therein, and certain others have a cooling tube 32 embedded therein.

Each shoe is formed with longitudinally extending ledges 33,34 at its opposite sides, which form respective longitudinally extending grooves 35,36 with the shoe side. The ledge and groove on one side of the shoe are in inverted relation with the ledge and groove on the opposite side of the shoe so that the ledges and grooves on adjoining sides of adjacent shoes interconnect, as seen in FIG. 6. This interconnection firmly holds the shoes in band fashion about the tubular member 37, but permits a limited amount of rocking of one shoe relative to the other.

As before, each shoe has an inner surface 38 transversely curved to be complementary to the transverse peripheral surface of the tubular member 37. Each shoe also has a central, longitudinally extending recess 39 in its outer surface to function in the same manner as the recess 20 heretofore described. Tensioning means, not shown, but similar to the means heretofore described, may be utilized to hold the shoes in band fashion about the tubular member 37.

I claim:
1. A thermal transfer unit for extruder barrels and other elongated tubular members, comprising:
   a jacket adapted to be clamped around the barrel, said jacket being formed of more than two elongated metal shoes adapted to be disposed lengthwise of the barrel and in side-to-side relation thereabout,
   at least certain shoes having temperature conditioning means and each having an inner transverse arcuately-shaped surface which is substantially complementary to the outer transverse surface of a selected barrel and adapted to lie in close contact therewith throughout the major part of the length of a respective shoe,
   a longitudinally extending groove in each shoe extending inwardly of the outer transverse surface intermediate the shoe sides, said groove providing for transverse flexing of the shoe,
   clamp means between at least one pair of adjacent shoes and having portions respectively seating within the longitudinally extending grooves in the same, said clamp means being constructed to draw together adjoining sides of said pair of shoes,
   and means at adjoining sides of adjacent shoes, except said adjoining sides of said pair of shoes, for interconnecting the same in band-forming relation about the barrel, said clamp means providing a tensioning force to draw the arcuate transverse inner surfaces of all shoes against the barrel peripheral surface.

2. The construction according to claim 1 wherein certain of said shoes contain cooling means and certain other of said shoes contain heating means.

3. The construction according to claim 2 wherein all of said shoes are identical in exterior formation.

4. The construction according to claim 1 wherein each of the opposite sides of each shoe is formed with a longitudinally extending ledge defining a longitudinally extending groove with the respective side of the shoe, the ledge and groove on one shoe side being parallel to but inverted with respect to the ledge and groove on the opposite shoe side, the ledge and groove on one shoe side interlocking with an inverted ledge and groove at the adjoining side of an adjacent shoe to connect such shoes.

5. The construction according to claim 1 wherein each of said shoes has a longitudinally extending groove in each of its opposite sides, the grooves being parallel,
   and an elongated connector spline having opposite side portions seating in the grooves in adjoining sides of adjacent shoes for connecting the same.

6. The construction according to claim 5 wherein each of said grooves has a cross-sectional shape of slightly more than a half circle,
   and wherein said spline has parallel enlargements at its side portions, each enlargement in cross-section being complementary to the shape of a groove.

7. A thermal transfer unit for extruder barrels and other elongated tubular members, comprising:
   a jacket adapted to be clamped around the barrel, said jacket being formed of more than two elongated metal shoes adapted to be disposed lengthwise of the barrel and in side-by-side relation thereabout,
   at least certain shoes having temperature conditioning means and each having an inner transverse arcuately-shaped surface which is substantially complementary to the outer transverse surface of a selected barrel and adapted to lie in close contact therewith throughout the major part of the length of a respective shoe,
   each of the sides of each shoe being formed with a longitudinally extending ledge defining a longitudinally extending groove with the respective side of the shoe, the ledge and groove on one shoe side being parallel to but inverted with respect to the ledge and groove on the opposite shoe side, the ledge and groove on one shoe side interlocking with an inverted ledge and groove at the adjoining side of an adjacent shoe to connect the same.

* * * * *